US010695919B2

(12) United States Patent
Naito et al.

(10) Patent No.: US 10,695,919 B2
(45) Date of Patent: Jun. 30, 2020

(54) CONTACT DETERMINATION DEVICE, CONTROL DEVICE, CONTACT DETERMINATION SYSTEM, CONTACT DETERMINATION METHOD, AND NON-TRANSITORY COMPUTER-READABLE RECORDING MEDIUM

(71) Applicant: OMRON Corporation, Kyoto (JP)

(72) Inventors: Sayaka Naito, Joyo (JP); Yoshikazu Mori, Koriyama (JP); Kazuki Kasai, Tokyo (JP); Osamu Nishizaki, Nara (JP)

(73) Assignee: OMRON Corporation, Kyoto (JP)

( * ) Notice: Subject to any disclaimer, the term of this patent is extended or adjusted under 35 U.S.C. 154(b) by 380 days.

(21) Appl. No.: 15/750,507

(22) PCT Filed: Jan. 11, 2017

(86) PCT No.: PCT/JP2017/000565
§ 371 (c)(1),
(2) Date: Feb. 6, 2018

(87) PCT Pub. No.: WO2017/141575
PCT Pub. Date: Aug. 24, 2017

(65) Prior Publication Data
US 2018/0229379 A1    Aug. 16, 2018

(30) Foreign Application Priority Data
Feb. 15, 2016  (JP) ................. 2016-025963

(51) Int. Cl.
*G06T 7/73*     (2017.01)
*B25J 19/02*    (2006.01)
(Continued)

(52) U.S. Cl.
CPC ............ *B25J 19/02* (2013.01); *B25J 9/1602* (2013.01); *B25J 9/1674* (2013.01); *B25J 9/1676* (2013.01);
(Continued)

(58) Field of Classification Search
CPC ........ B25J 19/02; B25J 9/1674; B25J 9/1676; B25J 19/06; B25J 13/084; G06T 7/74;
(Continued)

(56) References Cited

U.S. PATENT DOCUMENTS

2009/0171505 A1* 7/2009 Okazaki ................ B25J 9/1676
700/258
2015/0158178 A1* 6/2015 Burmeister ............ B25J 9/1697
382/203

(Continued)

FOREIGN PATENT DOCUMENTS

JP    S6164990       5/1986
JP    2006247780     9/2006
(Continued)

OTHER PUBLICATIONS

Milos Vasic, and Aude Billard; "Safety Issues in Human-Robot Interactions"; IEEE; 2013.*
(Continued)

*Primary Examiner* — Shaghayegh Azima
(74) *Attorney, Agent, or Firm* — JCIPRNET

(57) ABSTRACT

The present invention provides a contact determination device, control device, contact determination system, contact determination method, and contact determination program. This contact determination device acquires position information and/or posture information for a target person. Further, the state of movement of a part to be calculated in the body of the target person is calculated on the basis of acquired movement information and a body model relating to the shape of the body of the target person, said body model having been recorded in advance. Meanwhile, an electrical change is detected. Then, the contact determination device determines the state of contact between the target person and the object to be controlled on the basis of the
(Continued)

detected electrical change and the state of movement of the part to be calculated in the body of the target person.

19 Claims, 8 Drawing Sheets

(51) Int. Cl.
  *B25J 19/06* (2006.01)
  *B25J 9/16* (2006.01)
  *B25J 13/08* (2006.01)
(52) U.S. Cl.
  CPC .............. *B25J 13/084* (2013.01); *B25J 19/06* (2013.01); *G06T 7/75* (2017.01); *G05B 2219/39082* (2013.01); *G05B 2219/40201* (2013.01); *G06T 2207/30196* (2013.01)
(58) Field of Classification Search
  CPC ............ G06T 7/75; G06T 2207/30196; G05B 2219/40201; G05B 2219/39082
  See application file for complete search history.

(56) References Cited

U.S. PATENT DOCUMENTS

| | | | |
|---|---|---|---|
| 2015/0239124 A1* | 8/2015 | Haddadin | ............. B25J 9/1676 700/255 |
| 2016/0031086 A1* | 2/2016 | Tanabe | ..................... B25J 5/007 700/246 |
| 2016/0075023 A1* | 3/2016 | Sisbot | ..................... G06K 9/52 700/255 |

FOREIGN PATENT DOCUMENTS

| | | |
|---|---|---|
| JP | 2007026528 | 2/2007 |
| JP | 2010120139 | 6/2010 |
| JP | 2011073079 | 4/2011 |
| JP | 2011156641 | 8/2011 |
| JP | 2012223831 | 11/2012 |
| JP | 2013193137 | 9/2013 |
| JP | 2015227813 | 12/2015 |

OTHER PUBLICATIONS

"International Search Report (Form PCT/ISA/210) of PCT/JP2017/000565", dated Apr. 4, 2017, with English translation thereof, pp. 1-4.
"Written Opinion of the International Searching Authority of PCT/JP2017/000565" with English translation thereof, dated Apr. 4, 2017, p. 1-p. 10.
"Search Report of Europe Counterpart Application", dated Sep. 11, 2019, p. 1-p. 10.
Milos Vasic et al., "Safety Issues in Human-Robot Interactions", 2013 IEEE International Conference on Robotics and Automation (ICRA), May 2013, pp. 197-204.

* cited by examiner

CONTACT DETERMINATION DEVICE, CONTROL DEVICE, CONTACT DETERMINATION SYSTEM, CONTACT DETERMINATION METHOD, AND NON-TRANSITORY COMPUTER-READABLE RECORDING MEDIUM

CROSS-REFERENCE TO RELATED APPLICATION

This application is a 371 of international application of PCT application serial no. PCT/JP2017/000565, filed on Jan. 11, 2017, which claims the priority benefit of Japan application no. 2016-025963, filed on Feb. 15, 2016. The entirety of each of the abovementioned patent applications is hereby incorporated by reference herein and made a part of this specification.

TECHNICAL FIELD

The present invention relates to a contact determination device determining a contact condition between a target person and a control target, a control device controlling the control target based on a determination result of such a contact determination device, a contact determination system including such a contact determination device, a contact determination method using such a contact determination device, and a contact determination program for realizing such a contact determination device.

BACKGROUND ART

In diverse work sites such as factories, industrial robots and workers work in cooperation. For example, Patent Literature 1 discloses a system in which robots and one worker work in cooperation in production lines in a factory. In the system disclosed in Patent Literature 1, a worker wears a motion capture device measuring a work movement and a pressure sensor measuring a pressure on a hand and carries out work. Then, the industrial robots are controlled based on a work movement of the worker and loads applied to components obtained from measured pressures.

Diverse safety countermeasures have been devised in order to prevent accidents caused due to contact between an industrial robot and a worker when industrial robots and a worker work in cooperation. For example, Patent Literature 2 discloses a control device of a drive body which can reduce damage to each of members caused due to a collision. In the control device disclosed in Patent Literature 2, when it is detected that a hand of a robot has collided with an obstacle, the hand is moved such that damage to each of members caused due to the collision is reduced as much as possible.

Incidentally, in the related art, industrial robots of which the rated output exceeds 80 W have been required to be enclosed with a physical safety fence to be isolated from a worker. This 80 W regulation was relaxed in December 2013, so that if certain conditions are satisfied, even industrial robots exceeding 80 W can work in cooperation with a worker without a safety fence.

CITATION LIST

Patent Literature

[Patent Literature 1]
Japanese Unexamined Patent Application Publication No. 2011-156641
[Patent Literature 2]
Japanese Unexamined Patent Application Publication No. 2007-26528

SUMMARY OF INVENTION

Technical Problem

However, in accordance with relaxation of the 80 W regulation, ensuring safety has become a more important problem in cooperation between industrial robots and workers. Similarly, ensuring safety is also an important problem in industrial robots using 80 W or lower.

The present invention has been made in consideration of such circumstances, and a main object thereof is to provide a contact determination device which can contribute to improvement of safety by determining a contact condition between a control target such as an industrial robot, and a target person such as a worker based on an electrical change and a movement state of the worker.

In addition, another object of the present invention is to provide a control device controlling a control target based on a determination result of the contact determination device according to the present invention.

In addition, another object of the present invention is to provide a contact determination system including the contact determination device according to the present invention.

In addition, another object of the present invention is to provide a contact determination method using the contact determination device according to the present invention.

In addition, another object of the present invention is to provide a contact determination program realizing the contact determination device according to the present invention.

Solution to Problem

In order to solve the problem described above, a contact determination device disclosed in this application determines a contact condition between a target person and a control target. The contact determination device includes a state information acquiring unit that acquires at least one of positional information and postural information of the target person; a body model acquiring unit that acquires a body model related to a shape of the body of the target person; a movement computing unit that computes a movement state of a computation target part in the body of the target person based on at least one of the positional information and the postural information acquired by the state information acquiring unit, and the body model acquired by the body model acquiring unit; a change acquiring unit that acquires information regarding an electrical change; and a contact condition determining unit that determines a contact condition between the target person and the control target based on the information regarding an electrical change acquired by the change acquiring unit, and the movement state of the computation target part of the target person computed by the movement computing unit.

In addition, the contact determination device further includes a measurement information acquiring unit that acquires measurement information indicating a measurement result of a measurement target part of the target person. The state information acquiring unit acquires at least one of the positional information and the postural information of the target person based on the measurement information acquired by the measurement information acquiring unit.

In addition, in the contact determination device, the state information acquiring unit computes at least one of the positional information and the postural information of the target person based on the measurement information acquired by the measurement information acquiring unit.

In addition, in the contact determination device, the measurement information acquiring unit acquires at least one of a speed, an acceleration, an angular speed, an angular acceleration, a pressure, and a magnetism as the measurement information.

In addition, the contact determination device further includes a body model calculating unit that calculates the body model related to a shape of the body of the target person based on at least one of the positional information and the postural information acquired by the state information acquiring unit, and a body model recording unit that records the body model calculated by the body model calculating unit. The body model acquiring unit acquires the body model from the body model recording unit.

In addition, in the contact determination device, the contact condition determining unit has means for detecting contact between the target person and the control target based on the information regarding an electrical change acquired by the change acquiring unit, and means for identifying a contact part based on the movement state of the computation target part computed by the movement computing unit, when contact is detected.

In addition, the contact determination device further includes means for determining an approaching condition between the target person and the control target based on the movement state computed by the movement computing unit. The change acquiring unit starts acquiring the information regarding an electrical change when the target person and the control target subjected to determination of the approaching condition therebetween are determined to have approached each other.

In addition, in the contact determination device, the state information acquiring unit acquires at least one of the positional information and the postural information of a plurality of target persons. The contact condition determining unit identifies a target person that has come into contact.

In addition, in the contact determination device, the change acquiring unit acquires at least one of a surface of the target person and a surface of the control target, or an electrical change in the vicinity thereof.

In addition, the contact determination device further includes a control target control unit that outputs a control command to control the control target, based on the contact condition determined by the contact condition determining unit.

In addition, in the contact determination device, the control target control unit outputs a control command to continue a movement, to halt a movement, to reduce an output regarding a movement, or to perform a contact avoiding movement.

Moreover, a control device disclosed in this application includes an input unit that receives an input of a contact condition between the target person and the control target from the contact determination device, and a control target control unit that outputs a control command to control the control target based on the contact condition received by the input unit.

In addition, in the control device, the control target control unit outputs a control command to continue a movement, to halt a movement, to reduce an output regarding a movement, or to perform a contact avoiding movement.

Moreover, a contact determination system disclosed in this application includes a control target that moves based on control, and the contact determination device that determines a contact condition. The contact determination device includes a control target movement information acquiring unit which acquires control target movement information related to a movement of the control target. The contact condition determining unit determines a contact condition based on the control target movement information acquired by the control target movement information acquiring unit.

In addition, in the contact determination system, the contact determination device includes a control target control unit which outputs a control command to control the control target based on the contact condition determined by the contact condition determining unit.

In addition, the contact determination system further includes a control device that controls the control target. The control device includes an input unit which receives an input of a contact condition from the contact determination device, and a control target control unit which outputs a control command to control the control target based on the contact condition received by the input unit.

Moreover, a contact determination method disclosed in this application is used for determining a contact condition between a target person and a control target. The contact determination method includes a step in which a state information acquiring unit acquires at least one of positional information and postural information of the target person; a step in which a body model acquiring unit acquires a body model related to a shape of the body of the target person; a step in which a movement computing unit computes a movement state of a computation target part in the body of the target person based on at least one of the positional information and the postural information acquired by the state information acquiring unit, and the body model acquired by the body model acquiring unit; a step in which a change acquiring unit acquires information regarding an electrical change; and a step in which a contact condition determining unit determines a contact condition between the target person and the control target based on the information regarding an electrical change acquired by the change acquiring unit, and the movement state of the computation target part of the target person computed by the movement computing unit.

Moreover, a contact determination program disclosed in this application is used for causing a computer to determine a contact condition between a target person and a control target. The contact determination program causes the computer to execute a step of acquiring at least one of positional information and postural information of the target person; a step of acquiring a body model related to a shape of the body of the target person; a step of computing a movement state of a computation target part in the body of the target person based on at least one of the acquired positional information and postural information, and the acquired body model; a step of acquiring information regarding an electrical change; and a step of determining a contact condition between the target person and the control target based on the acquired information regarding an electrical change and the computed movement state of the computation target part of the target person.

The contact determination device, the control device, the contact determination system, the contact determination method, and the contact determination program disclosed in this application can determine a contact condition between a target person and a control target based on an electrical change and a movement state of the target person.

Advantageous Effects of Invention

According to the present invention, a contact condition between a target person and a control target, for example, a contact part of a target person is determined based on a movement state of a computation target part computed based on positional information and/or postural information of a measurement target part, and a body model of the target person; and an electrical change. Accordingly, the present invention exhibits an excellent effect. For example, it is possible to contribute to improvement of safety in controlling a control target, or the like based on a determined contact condition.

DESCRIPTION OF EMBODIMENT

Hereinafter, an embodiment of the present invention will be described with reference to the drawings. The following embodiment is an example in which the present invention is realized, and the embodiment is not characterized by limiting the technical scope of the present invention.

<System Configuration>

Figure 1:
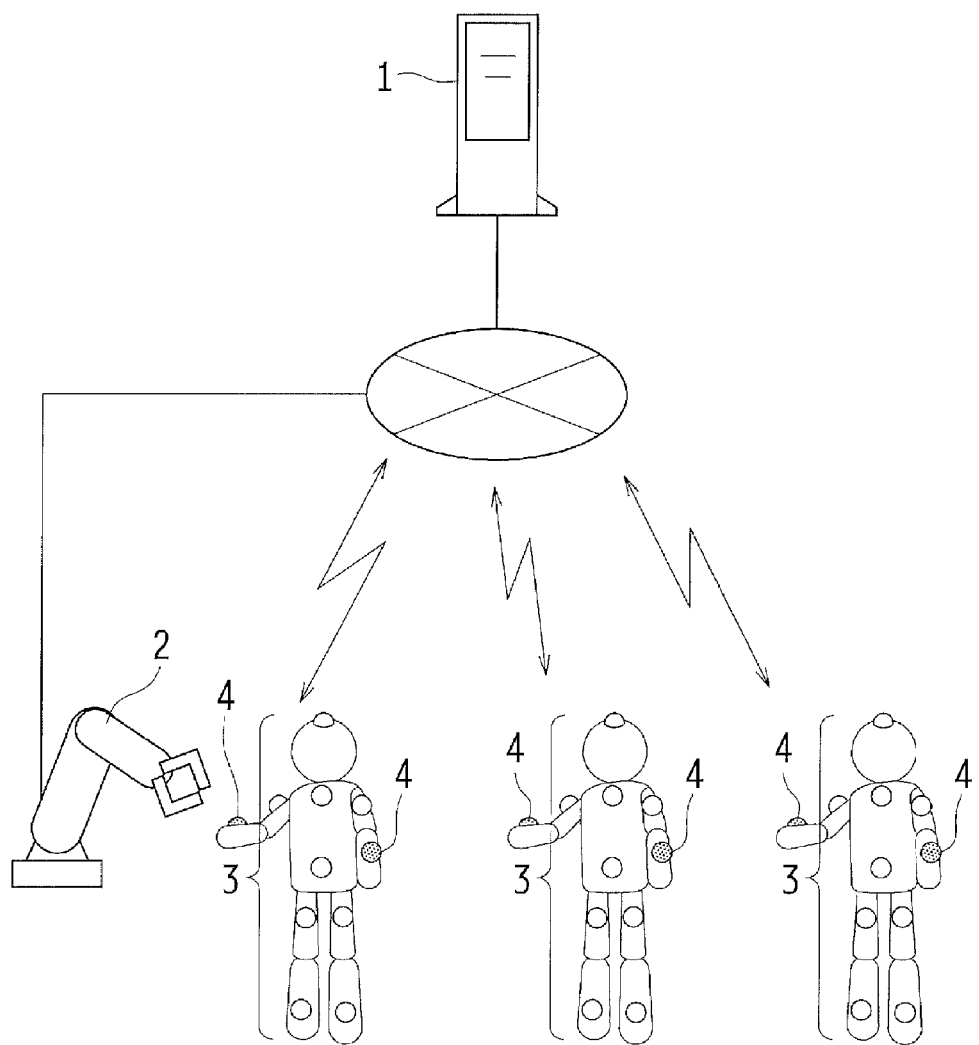
FIG. 1 is a view for conceptually describing an example of a contact determination system disclosed in this application.

First, an overview of a contact determination system disclosed in this application will be described. FIG. 1 is a view for conceptually describing an example of the contact determination system disclosed in this application. The contact determination system disclosed in this application includes a working robot (which will hereinafter be referred to as a robot) 2 as a control target which works in response to a predetermined control command. The contact determination system is applied to a system such as a factory automation (FA) system in which a worker (target person) works in cooperation with the robot 2. The worker wears wearable devices 3 including diverse inertial sensors such as an acceleration sensor and a gyro sensor on various measurement target parts of the body, that is, measurement target parts such as the head, upper arms, forearms, the chest, the abdomen, femurs, and crura, for example. The wearable devices 3 including various inertial sensors measure the measurement target parts of the body of a target person and output various pieces of measurement information indicating a measurement result. As sensors installed in the wearable devices 3, it is possible to use sensors such as a magnetic sensor and a pressure sensor, in addition to inertial sensors such as an acceleration sensor and a gyro sensor. In addition, contact sensors (detection devices) 4 including sensors such as a voltage sensor, a current sensor, an electric field sensor, and an electromagnetic wave sensor for detecting, for contact, a change in electrical characteristics such as a voltage, a current, an electric field, and electromagnetic waves in the surroundings are provided in parts such as the hands of a worker. The sensors output a contact result based on a detected electrical change. When a plurality of workers are working, each of the workers who become targets of impact estimation wears the wearable devices 3. In FIG. 1, to facilitate understanding, in a worker wearing the wearable devices 3, parts, at which the inertial sensors are positioned, are indicated with white circles, and parts, at which the contact sensors 4 are positioned, are indicated with stippled white circles. In addition, for convenience of illustration, when an inertial sensor and contact sensors 4 are positioned at parts close to each other, illustration of the contact sensors 4 has priority.

Moreover, the contact determination system includes a contact determination device 1 which acquires various pieces of information output from the wearable devices 3 and the contact sensors 4 and determines a contact condition between a worker and the robot 2. For example, the contact determination device 1 is constituted using a computer such as a control computer controlling the robot 2. The contact determination device 1 is indirectly or directly connected to the wearable devices 3, the contact sensors 4, and the robot 2 via a communication network such as a local area network (LAN) using a wireless or wired communication method to be able to communicate therewith. The contact determination device 1 performs communication of various pieces of information and signals.

Here, for convenience of description, the robot 2 and the contact determination device 1 are disclosed as separate devices independent from each other. However, the contact determination device 1 may be a device built in the robot 2. In such a case, a circuit or a program which functions as the contact determination device 1 may be built in a portion of a control circuit which controls movement of the robot 2. Moreover, there may be a plurality of robots 2. In such a case, the contact determination device 1 may be built in each of the robots 2.

Figure 2A:
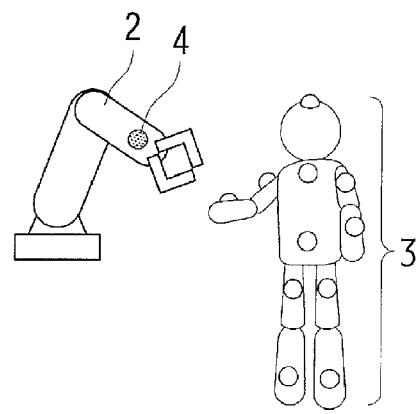
FIG. 2A and FIG. 2B are views for conceptually describing another example of the contact determination system disclosed in this application.
Figure 2B:
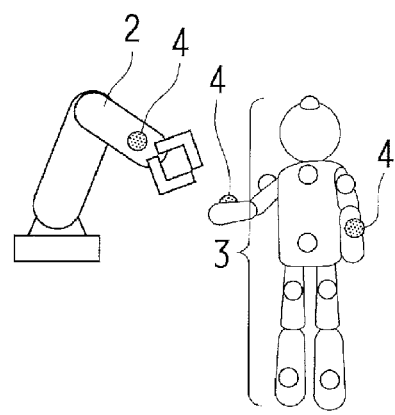

FIG. 2A and FIG. 2B are views for conceptually describing another example of the contact determination system disclosed in this application. FIG. 2A and FIG. 2B illustrate different forms of disposition positions of the contact sensors 4 such as the voltage sensor, the current sensor, the electric field sensor, and the electromagnetic wave sensor in the contact determination system described using FIG. 1. FIG. 2A illustrates a form in which the contact sensors 4 are disposed in an arm portion included in the robot 2, and FIG. 2B illustrates a form in which the contact sensors 4 are disposed in both the hands of a worker and the arm portion of the robot 2. As illustrated in FIG. 1, FIG. 2A and FIG. 2B, the contact sensors 4 need only detect an electrical change between the robot 2 and a worker as contact targets and can be disposed at diverse places.

<Configuration of Device>

Figure 3:
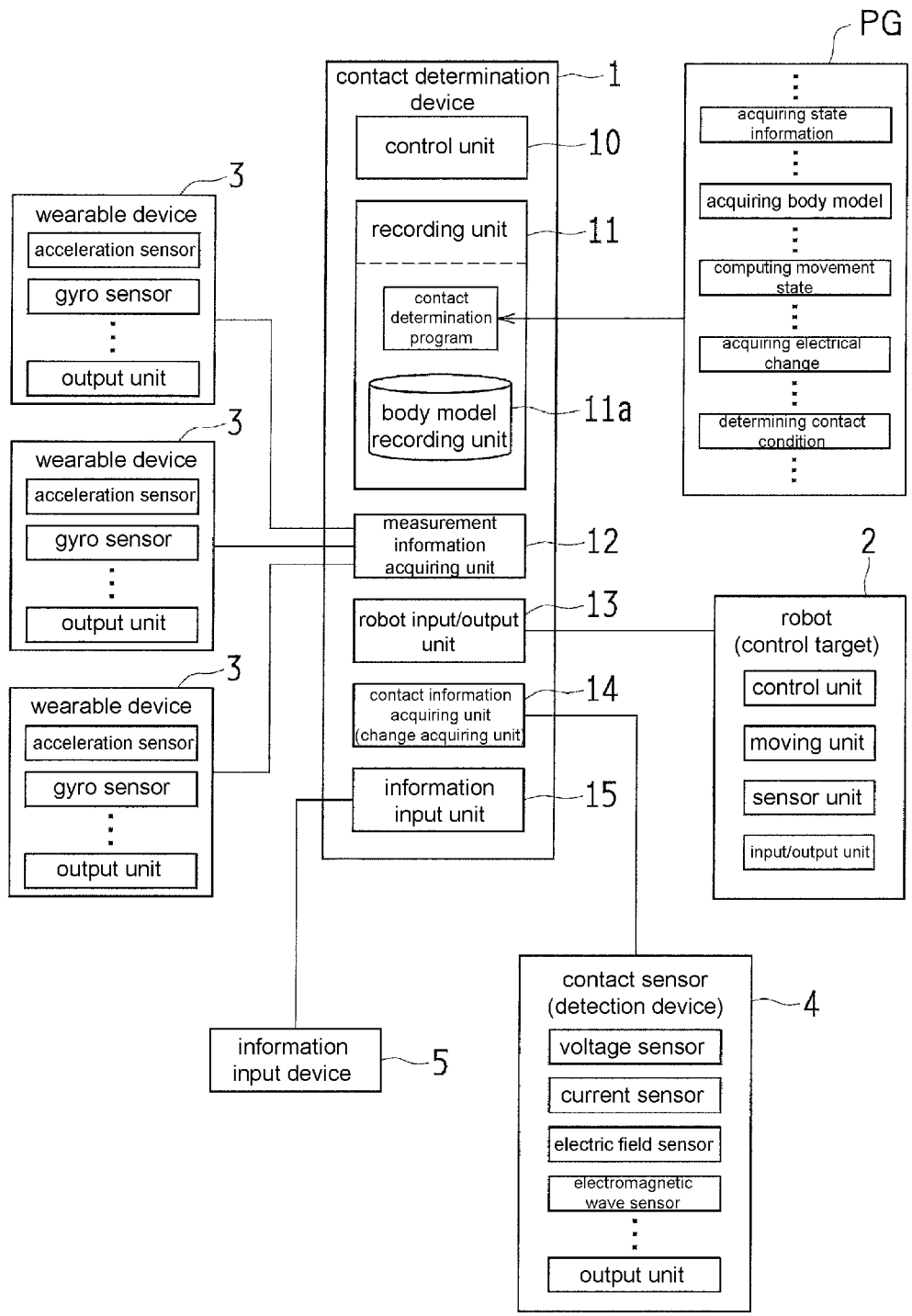
FIG. 3 is a block diagram illustrating an example of a hardware configuration of a contact determination device and other various devices included in the contact determination system disclosed in this application.

Next, an example of a configuration of various devices included in the contact determination system disclosed in this application will be described. FIG. 3 is a block diagram illustrating an example of a hardware configuration of the contact determination device 1 and other various devices included in the contact determination system disclosed in this application. The contact determination device 1 includes a control unit 10 and a recording unit 11. Moreover, as interfaces with respect to other devices, the contact determination device 1 includes a measurement information acquiring unit 12, a robot input/output unit 13, a contact information acquiring unit (change acquiring unit) 14, and an information input unit 15.

The control unit 10 is constituted of a processor such as a central processing unit (CPU) and a memory such as a register. The control unit 10 controls the device in its entirety by executing various commands and outputs a control command to the robot 2.

The recording unit 11 includes non-volatile memories such as a read only memory (ROM) and an erasable programmable read only memory (EPROM), a volatile memory such as a random access memory (RAM), and recording mediums such as a hard disk drive and a semiconductor memory. The recording unit 11 records data such as various programs and information. In addition, a contact determination program PG causing a computer such as a control computer to function as the contact determination device 1 according to the present invention is recorded in a recording domain of the recording unit 11. In addition, a portion in the recording domain of the recording unit 11 is used as a body model recording unit 11*a* for recording a body model schematizing the shape of the body of each worker. The body model denotes a digitized model which is schematized using numerical values of lengths and the like of various parts such as upper arms, forearms, femurs, and crura of the body of each worker. In the body model recording unit 11*a*, the body model related to each worker is recorded in association with worker identification information (worker's ID) identifying the worker. Instead of using a portion in the recording domain of the recording unit 11 included in the contact determination device 1 as the body model recording unit 11*a*, a recording device such as a server computer in which various pieces of information are recorded may be connected to the contact determination device 1, and a portion in a recording domain of the recording device connected to the contact determination device 1 may be used as database of the body model recording unit 11*a* and the like. That is, the body model recording unit 11*a* need only be in a state in which the control unit 10 included in the contact determination device 1 can have access thereto and can record and read data thereof. The body model recording unit 11*a* can be designed to have diverse forms.

The measurement information acquiring unit 12 is an interface for acquiring various pieces of information such as measurement information indicating a measurement result from each of the wearable devices 3. The robot input/output unit 13 is an interface for acquiring various pieces of information from the robot 2 and outputting various commands. The contact information acquiring unit 14 is an interface for acquiring various pieces of information regarding an electrical change such as information indicating contact from the contact sensors 4. For example, the information input unit 15 is an interface for communicating with various devices such as an information input device 5 used for inputting various pieces of information such as information indicating a body model. The interfaces are not necessarily present as independent devices and can be suitably used in common. On the other hand, it is possible to provide a plurality of devices for inputting and outputting different types of information with respect to one device. For example, when information is transmitted and received with respect to a different device via a communication network, the configuration need only include one device to be connected to the communication network. On the other hand, it is possible to include a device acquiring various pieces of information from the robot 2, and a device outputting a command to the robot 2. Moreover, the information input unit 15 may receive an input of a body model from the information input device 5 using a device such as a tablet computer and may receive an input of a body model from a portable recording medium such as various semiconductor memories. The information input unit 15 can be suitably designed.

A computer such as a control computer functions as the contact determination device 1 by executing various steps such as reading various programs, for example, the contact determination program PG, recorded in the recording unit 11, acquiring state information (positional information and/or postural information) included in the read contact determination program PG, acquiring a body model, computing a movement state, acquiring information regarding an electrical change, and determining a contact condition, while being under control of the control unit 10.

The robot 2 includes various configurations such as the control unit 10 which controls the device in its entirety, a moving unit such as the arm portion which carries out work, a sensor unit which detects information of a posture and the like, and the input/output unit which communicates with the contact determination device 1.

The wearable devices 3 include various configurations such as a measurement unit using sensors (for example, an acceleration sensor and a gyro sensor) for detecting information related to a movement, and other output units. As sensors installed in the wearable devices 3, it is possible to use sensors such as a magnetic sensor and a pressure sensor measuring physical quantities, in addition to an acceleration sensor and a gyro sensor. In the wearable devices 3, the measurement unit measures physical quantities such as a speed, an angular speed, an acceleration, an angular acceleration, a pressure, and a magnetism, and the output unit outputs a measurement result as measurement information (raw data or the like indicating a measurement result related to a movement of a worker) to the contact determination device 1. The contact determination device 1 acquires the state information such as the positional information and the postural information indicating the states of the measurement target parts calculated based on the measurement information indicating physical quantities such as a speed, an angular speed, an acceleration, an angular acceleration, a pressure, and a magnetism. For example, the positional information can be calculated by integrating the acceleration measured by the acceleration sensor twice. In regard to the state information such as the positional information and the postural information calculated based on the measurement information indicating physical quantities such as a speed, an angular speed, an acceleration, an angular acceleration, a pressure, and a magnetism, the state info nation may be computed by any of the wearable devices 3 and the contact determination device 1.

The contact sensors 4 include various configurations such as sensors (for example, a voltage sensor, a current sensor, an electric field sensor, and an electromagnetic wave sensor) for detecting electrical characteristics, and an output unit. In the contact sensors 4, the output unit outputs information indicating contact such as contact between a worker and the robot 2 to the contact determination device 1 based on a change in electrical information such as a voltage, a current, an electric field, and electromagnetic waves indicating electrical characteristics detected by the sensors in the vicinity of a surface of a worker and/or a surface of the robot 2.

Figure 4:
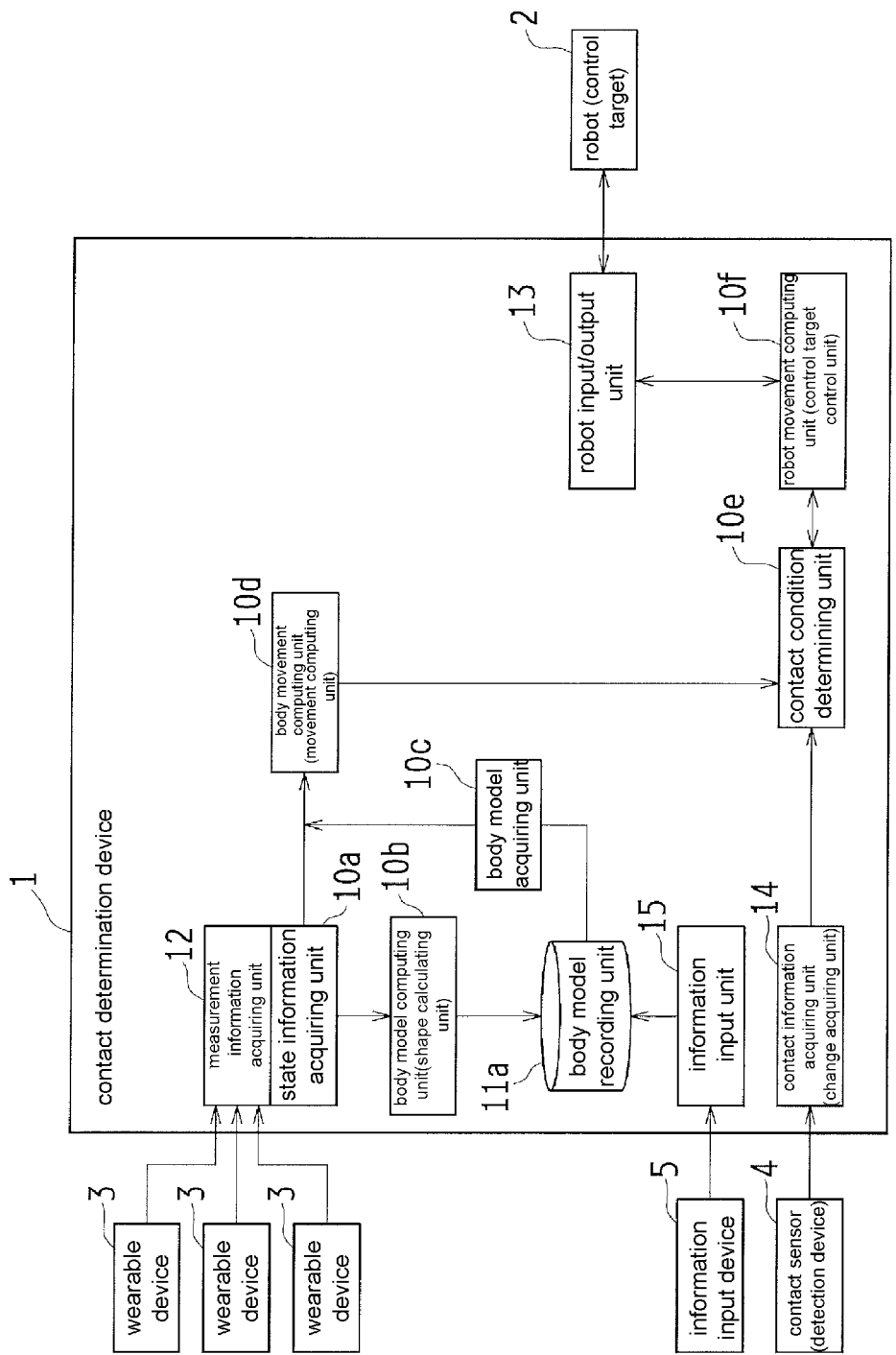
FIG. 4 is a functional block diagram illustrating an example of a functional configuration of the contact determination device and other various devices included in the contact determination system disclosed in this application.

FIG. 4 is a functional block diagram illustrating an example of a functional configuration of the contact determination device 1 and other various devices included in the contact determination system disclosed in this application. The contact determination device 1 executes various programs such as the contact determination program PG and realizes functions as computing units (for example, a state information acquiring unit 10a, a body model computing unit 10b, a body model acquiring unit 10c, a body movement computing unit (movement computing unit) 10d, a contact condition determining unit 10e, and a robot movement computing unit (control target control unit) 10f) executing various computations based on control of the control unit 10. Each of the diverse computing units realizing various functions can be mounted as a dedicated circuit using a semiconductor chip such as a large scale integration (LSI) and a very large scale integration (VLSI).

The state information acquiring unit 10a acquires the state information of the measurement target parts, such as the positional information and the postural information through a computation based on the measurement information indicating physical quantities such as a speed, an angular speed, an acceleration, an angular acceleration, a pressure, and a magnetism acquired by the measurement information acquiring unit 12 from the wearable devices 3. When the wearable devices 3 compute the state information such as the positional information and the postural information from the measurement information, and when the contact determination device 1 acquires the state information, the state information acquiring unit 10a acquires the acquired state information as it is, as information to be used in the computations thereafter.

The body model computing unit 10b executes a computation of calculating a body model which is schematized data of the shape of the body of a worker, based on various pieces of state information such as the positional information and the postural information acquired by the state information acquiring unit 10a. A body model based on various pieces of state information based on measurements of the wearable devices 3 which a worker wears can be calculated using diverse technologies in the related art. For example, it is possible to apply the method disclosed in "Hiroshi KANASUGI, Ryosuke SHIBASAKI, Measurement and Analysis of Body Movement Using Wearable Sensor, Japan Society of Photogrammetry and Remote Sensing, Journal of JSPRS, 2005, pp. 199-202, 2005.06".

The body model acquiring unit 10c executes processing of acquiring the body model recorded in the body model recording unit 11a.

The body movement computing unit 10d executes a computation of calculating the movement states of the computation target parts such as the hands and the legs in the body of a worker based on the state information acquired by the body model acquiring unit 10c and the body model acquired from the body model recording unit 11a by the body model acquiring unit 10c. For example, the movement state is calculated as information such as positions of the computation target parts, a moving direction, an estimated position after a predetermined time, and an estimated moving direction.

The contact condition determining unit 10e performs a computation for determining a contact condition whether or not a worker and the robot 2 are in contact with each other, based on an electrical change and the movement state of the computation target parts of a worker. An electrical change indicates a change in electrical characteristics such as a voltage, a current, an electric field, and electromagnetic waves detected by the contact sensors 4. For example, an electrical change is output from the contact sensors 4 as information indicating contact, and the output information is acquired via the contact information acquiring unit 14. The contact sensors 4 may output electrical information such as a voltage, a current, an electric field, and an electromagnetic wave, or information indicating a change therein. In such a case, the contact condition determining unit 10e calculates the amount of the change and determines the presence of contact. That is, the contact condition determining unit 10e can be designed such that occurrence of contact based on an electrical change can be acquired by diverse methods. When occurrence of an electrical change is acquired, the contact condition determining unit 10e determines whether or not a portion of the body of a worker, such as the computation target parts, and the robot 2 are in contact with each other. For example, the position and the movement state of the robot 2 are acquired from the robot movement computing unit 10f. In addition, in determination of the presence of contact, the contact condition determining unit 10e also determines which worker is in contact. When the presence of contact is determined, the contact condition determining unit 10e executes processing for arbitrarily controlling the robot 2, as necessary.

The robot movement computing unit 10f communicates with the robot 2 via the robot input/output unit 13 and executes outputting a control command to the robot 2, inputting a movement state from the robot 2, and processing of various computations and the like for controlling the robot 2. For example, the robot movement computing unit 10f outputs the movement state of the robot 2 to the contact condition determining unit 10e, receives an input from the contact condition determining unit 10e based on contact between a worker and the robot 2, and outputs a control command for arbitrarily controlling the robot 2 to the robot 2. Examples of a control command output from the robot movement computing unit 10f to the robot 2 include control commands to continue a movement, to halt a movement, to reduce an output regarding a movement, and to perform a contact avoiding movement.

<Configuration of Processing>

Figure 5:
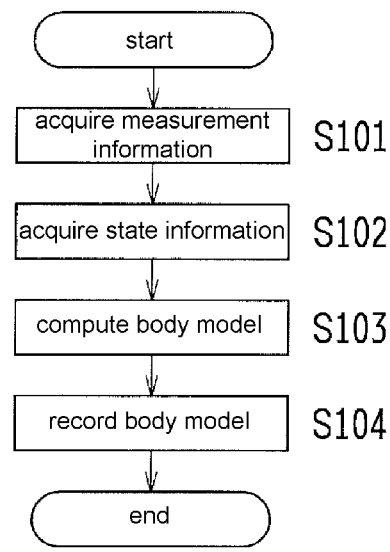
FIG. 5 is a flow chart illustrating an example of first body model recording processing of the contact determination device included in the contact determination system disclosed in this application.

Diverse steps of processing of the contact determination device 1, which is configured as described above and is included in the contact determination system disclosed in this application, will be described. FIG. 5 is a flow chart illustrating an example of first body model recording processing of the contact determination device 1 included in the contact determination system disclosed in this application. The first body model recording processing is processing in which a worker wearing the wearable devices 3 makes a movement, information based on the movement is acquired, and a body model computed from the acquired information is recorded in the body model recording unit 11a.

The control unit 10 included in the contact determination device 1 executes the first body model recording processing by executing various programs such as the contact determination program PG. The control unit 10 of the contact determination device 1 causes the measurement information acquiring unit 12 to acquire measurement information from the wearable devices 3 which a worker is wearing (S101). Acquiring measurement information in Step S101 is processing in which the worker wearing various inertial sensors as the wearable devices 3 makes a predetermined reference movement, and the measurement information acquiring unit 12 acquires measurement information indicating at least one of physical quantities such as a speed, an angular speed, an acceleration, an angular acceleration, a pressure, and a magnetism of the measurement target parts measured in accordance with the reference movement made by the worker.

The control unit 10 causes the state information acquiring unit 10*a* to acquire the state information such as the positional information and the postural information through a computation based on the measurement information acquired by the measurement information acquiring unit 12 (S102). Step S102 is processing in which at least one of the positional information and the postural information of the target person is computed as the state information based on the measurement information acquired by the measurement information acquiring unit 12 measuring a movement of the target person.

The control unit 10 causes the body model computing unit 10*b* to perform a computation such that the body model which is schematized data of the shape of the body of the worker is calculated (computed) based on the acquired state information (S103).

The control unit 10 causes the body model recording unit 11*a* to record the calculated body model in association with worker identification information identifying the worker that has made a movement (S104).

In this manner, the first body model recording processing is executed.

Figure 6:
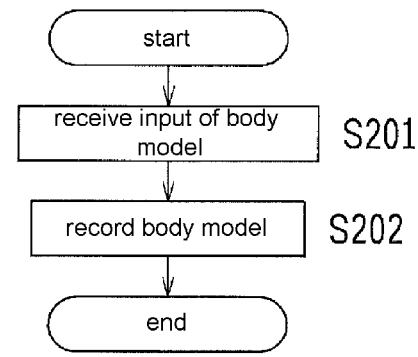
FIG. 6 is a flow chart illustrating an example of second body model recording processing of the contact determination device included in the contact determination system disclosed in this application.

FIG. 6 is a flow chart illustrating an example of second body model recording processing of the contact determination device 1 included in the contact determination system disclosed in this application. The second body model recording processing is processing in which a body model computed in advance is input to the contact determination device 1 from the information input device 5 in which the body model is recorded.

The control unit 10 included in the contact determination device 1 executes the second body model recording processing by executing various programs such as the contact determination program PG. The control unit 10 of the control contact determination device 1 causes the information input unit 15 to receive inputs of the body model and corresponding worker identification information from the information input device 5 connected to the contact determination device 1 (S201). Then, the control unit 10 records the received body model in association with the worker identification information in the body model recording unit 11*a* (S202).

In this manner, the second body model recording processing is executed.

As processing of recording model information in the body model recording unit 11*a*, any of the first body model recording processing and the second body model recording processing may be used, and another method may be used.

Figure 7:
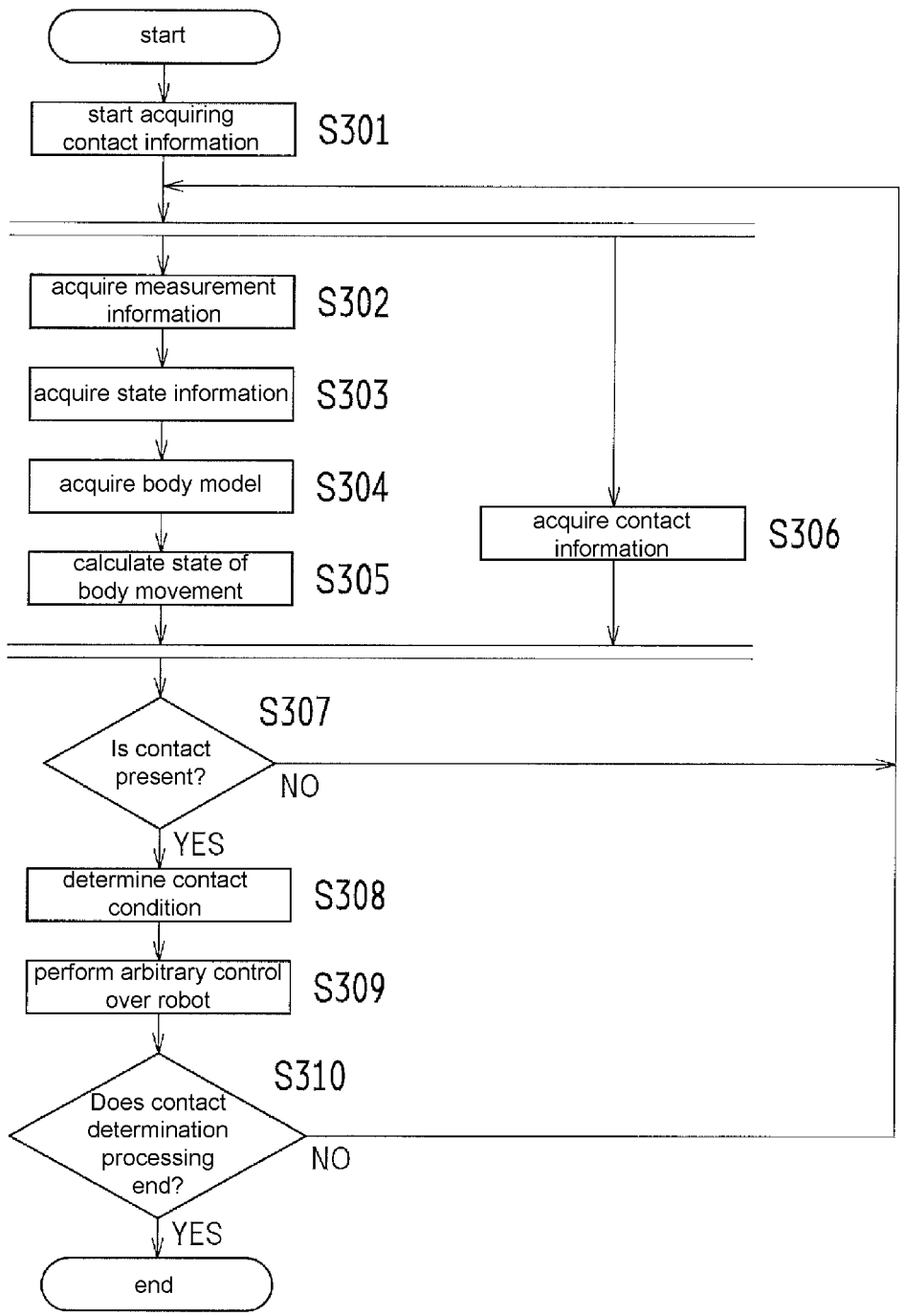
FIG. 7 is a flow chart illustrating an example of first contact determination processing of the contact determination device included in the contact determination system disclosed in this application.

FIG. 7 is a flow chart illustrating an example of first contact determination processing of the contact determination device 1 included in the contact determination system disclosed in this application. The first contact determination processing is processing in which the contact condition between the robot 2 and a worker is determined based on the acquired electrical change and the body model recorded in the body model recording unit 11*a* through the first body model recording processing or the second body model recording processing. In the first contact determination processing, the contact sensors 4 are used in an activated state at all times, in which detection processing of detecting a change in electrical characteristics is continuously performed.

The control unit 10 included in the contact determination device 1 executes the first contact determination processing by executing various programs such as the contact determination program PG. The control unit 10 of the contact determination device 1 starts acquiring contact information (S301). In Step S301, processing in which the contact information acquiring unit 14 acquires an electrical change output by the contact sensors 4 or information indicating contact based on the electrical change starts.

Then, the control unit 10 executes processing of calculating the movement state of the worker and processing of acquiring the contact information in a manner of parallel processing. That is, as one part of the processing, the control unit 10 causes the measurement information acquiring unit 12 to acquire the measurement information (S302) and causes the state information acquiring unit 10*a* to acquire the state information based on the acquired measurement information (S303). Moreover, the control unit 10 causes the body model acquiring unit 10*c* to acquire the body model recorded in the body model recording unit 11*a* (S304). Then, the control unit 10 causes the body movement computing unit 10*d* to calculate the movement states of the computation target parts based on the state information and the body model which have been acquired (S305). The movement states of the computation target parts based on the measurement information are calculated for each worker.

In addition, as the other part of the processing, the control unit 10 causes the contact information acquiring unit 14 to acquire information indicating contact based on an electrical change (S306).

After the parallel processing, the control unit 10 causes the contact condition determining unit 10*e* to determine whether or not the target person and the control target are in contact with each other based on the information indicating contact based on the electrical change (S307). In Step S307, when a change, in which information indicating electrical characteristics such as a voltage, a current, an electric field, and electromagnetic waves on a surface of a hand of the worker and/or a surface of an arm of the robot 2, or in the vicinity thereof detected by the contact sensors 4 exceeds a reference value set in advance, is detected, the worker and the robot 2 are determined to be in contact with each other. In Step S304, when the worker and the robot 2 are determined not to be in contact with each other (S307: NO), the control unit 10 executes the parallel processing of the processing of calculating the movement state of the worker and the processing of acquiring the contact information again.

In Step S307, when the worker and the robot 2 are determined to be in contact with each other (S307: YES), the control unit 10 causes the contact condition determining unit 10*e* to determine the contact condition between the worker and the robot 2 (S308). In Step S308, the contact condition is determined based on the acquired movement states of the computation target parts of each worker, and the movement state of the robot 2 acquired from the robot movement computing unit 10*f*. For example, determination of the contact condition mentioned herein indicates identification of the worker in contact with the robot 2 and the contact part.

Even if there is a change in electrical characteristics detected by the contact sensors 4, it may be determined that there is no presence of contact or detection is required to be performed again, from the computation target parts of the target person computed by the body movement computing unit 10d and the movement state of the robot 2 acquired from the robot movement computing unit 10f. That is, in Steps S307 to S308, the control unit 10 of the contact determination device 1 determines a contact condition between the worker and the robot 2 based on the acquired information regarding an electrical change and the computed movement states of the computation target parts of the worker.

The control unit 10 which has determined the contact condition performs arbitrary control over the robot 2 by outputting a control command from the robot movement computing unit 10f to the robot 2 via the robot input/output unit 13 (S309). The arbitrary control in Step S309 denotes that predetermined control set in advance, such as continuing a movement, halting a movement, reducing an output regarding a movement, and performing a movement to avoid contact with the worker, as well as shifting to a safety mode and collecting info illation, is performed with respect to the robot 2 based on the contact condition determined in Step S308. The control unit 10 outputs a control command for performing arbitrary control to the robot 2.

Then, the control unit 10 determines whether or not to end the contact determination processing (S310). For example, when the worker ends work and performs a predetermined operation to end the contact determination processing, the control unit 10 which has received the operation determines to end the contact determination processing.

In Step S310, when the contact determination processing is determined to end (S310: YES), the control unit 10 ends the contact determination processing. In Step S310, when the contact determination processing is determined not to end (S310: NO), the control unit 10 executes the parallel processing of the processing of calculating the movement state of the worker and the processing of acquiring the contact information again.

In this manner, the first contact determination processing is executed. Through the first contact determination processing, the contact determination device 1 determines a contact condition such as the presence or absence of contact between a worker and the robot 2, a worker in contact, and the contact part of the worker based on an electrical change detected by the contact sensors 4 and a movement condition computed from the measurement information acquired from the wearable devices 3. Then, arbitrary control of the robot 2 is appropriately performed in accordance with the determined contact condition. Accordingly, appropriate control can be performed in accordance with the contact condition. Consequently, the robot 2 is not excessively halted while safety of a worker is ensured. Therefore, it is possible to prevent unnecessary deterioration of productivity. Such an effect leads to realizing safe cooperation between the robot 2 and a worker even if the robot 2 and the worker are in circumstances not isolated by a safety fence. In addition, the information collected as a part of arbitrary control can be useful for various types of amelioration such as work amelioration and control amelioration in the future, and it is possible to expect further improved safety.

Figure 8:
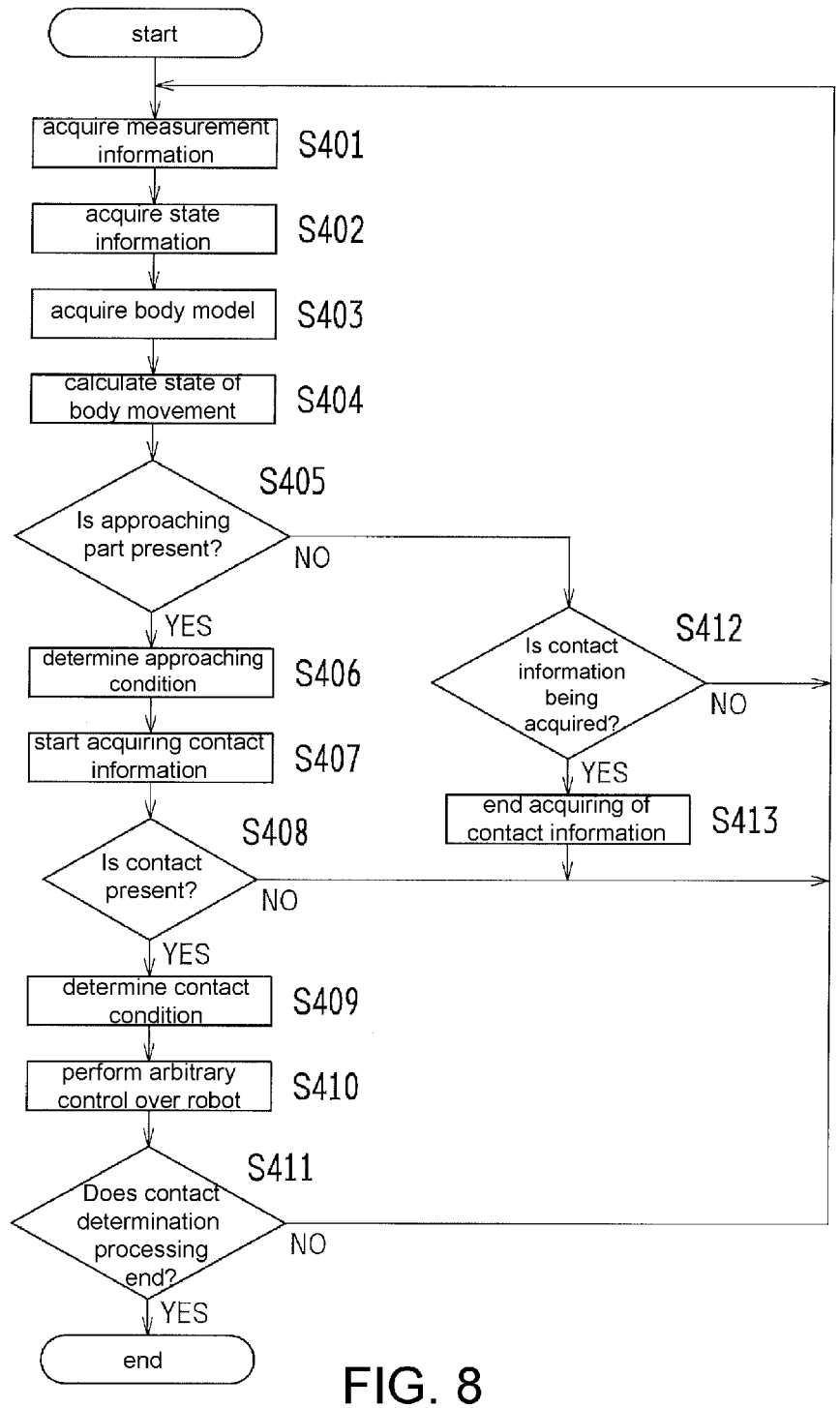
FIG. 8 is a flow chart illustrating an example of second contact determination processing of the contact determination device included in the contact determination system disclosed in this application.

FIG. 8 is a flow chart illustrating an example of second contact determination processing of the contact determination device 1 included in the contact determination system disclosed in this application. The second contact determination processing is a modification example of the first contact determination processing and is performed in a form in which the contact sensors 4 are not activated at all times but are activated when a possibility of contact is determined to be present.

The control unit 10 included in the contact determination device 1 executes the second contact determination processing by executing various programs such as the contact determination program PG. The control unit 10 of the contact determination device 1 causes the measurement information acquiring unit 12 to acquire the measurement information (S401) and causes the state information acquiring unit 10a to acquire the state information based on the measurement information (S402). Moreover, the control unit 10 causes the body model acquiring unit 10c to acquire the body model recorded in the body model recording unit 11a (S403). Then, the control unit 10 causes the body movement computing unit 10d to calculate the movement states of the computation target parts based on the state information and the body model which have been acquired (S404).

The control unit 10 determines whether or not there is a part of the worker approaching the robot 2, as an approaching condition based on the calculated movement states of the computation target parts of each worker and the movement state of the robot 2 acquired from the robot movement computing unit 10f (S405). In Step S405, for example, the right hand, which is one of the computation target parts of the worker, is making a movement approaching the robot 2. When the worker is determined to be in circumstances such as a case of approaching the reference value or lower and a case in which contact is expected within a reference time, it is determined that there is an approaching part.

In Step S405, when it is determined that there is a part approaching the robot 2 (S405: YES), the control unit 10 determines the approaching condition based on the movement state of each worker and the movement state of the robot 2 (S406). Determination of the approaching condition in Step S406 is identification of the worker approaching the robot 2 and identification the approaching part.

In addition, the control unit 10, which has determined that the worker and the robot 2 approach each other, starts acquiring the contact information (S407). In Step S407, the contact sensors 4 are activated, and control is performed to start acquiring the contact information based on detection of an electrical change. When the contact sensors 4 are already activated and are in an operation state, the operation state continues and the contact information is acquired.

The control unit 10 causes the contact condition determining unit 10e to acquire the contact information based on an electrical change and determines whether or not the worker and the robot 2 are in contact with each other (S408). In Step S408, when it is determined that the worker and the robot 2 are not in contact with each other (S408: NO), the control unit 10 returns to Step S401 and repeats the processing thereafter.

In Step S408, when it is determined that the worker and the robot 2 are in contact with each other (S408: YES), the contact condition determining unit 10e is caused to determine the contact condition between the worker and the robot 2 (S409). The control unit 10, which has determined the contact condition, performs arbitrary control over the robot 2 by outputting a control command from the robot movement computing unit 10f to the robot 2 via the robot input/output unit 13 (S410).

Then, the control unit 10 determines whether or not to end the contact determination processing (S411).

In Step S411, when it is determined to end the contact determination processing (S411: YES), the contact determination processing ends. In addition, operation of the contact sensors 4 and acquiring of the contact information also end. In Step S411, when it is determined not to end the contact determination processing (S411: NO), the control unit 10 returns to Step S401 and repeats the processing thereafter.

In Step S405, when it is determined that there is no part approaching the robot 2 (S405: NO), the control unit 10 determines whether or not the contact information is being acquired (S412). In Step S412, when it is determined that the contact information is being acquired (S412: YES), the control unit 10 ends operation of the contact sensors 4 and acquiring of the contact information (S413), returns to Step S401, and repeats the processing thereafter. In Step S412, when it is determined that the contact information is not being acquired (S412: NO), the control unit 10 returns to Step S401 and repeats the processing thereafter.

In this manner, the second contact determination processing is executed. Compared to the first determination processing, the second determination processing can save energy required to operate the contact sensors 4 and to acquire the electrical contact information.

The present invention is not limited to the embodiment described above and can be performed in various other forms. Therefore, the embodiment described above is merely an example in all respects and is not to be restrictively interpreted. The scope of the present invention is indicated by the claims and is not bound to the text of the specification at all. Moreover, all modifications and changes belonging to a scope equivalent to the claims are included in the scope of the present invention.

For example, in the embodiment, as the control target which becomes a target of determination of contact or approaching, a robot such as a working robot has been illustrated. However, various targets such as a target repeating a predetermined movement, and a target in a restrained state can also be the control target which will become a target of determination and can be developed in diverse forms.

In addition, the embodiment has been illustrated in a form in which the contact determination device 1 performs various computations using diverse computing units such as the body model computing unit 10b, the body movement computing unit 10d, and the robot movement computing unit 10f. However, the present invention is not limited thereto. That is, the present invention can be developed in various forms. For example, a different device can include a portion of the computing functions. The contact determination device 1 can acquire results of various computations from the different device and can cause the contact condition determining unit 10e to execute a computation regarding determination of the contact condition.

In addition, the embodiment has been illustrated in a form in which the contact determination device 1 controls the robot 2. However, the present invention is not limited thereto. The present invention can be developed in various forms. For example, separately from the contact determination device 1 determining the contact condition, a device for controlling the robot 2 can be provided.

<Another Example of System Configuration>

Separately from the contact determination device 1, an example of a system configuration in which a control device 6 controlling the robot 2 is provided will be described. A configuration similar to the example of the above-described system configuration including no control device 6 can be referred to the description related to the system described above, and the description is omitted.

Figure 9:
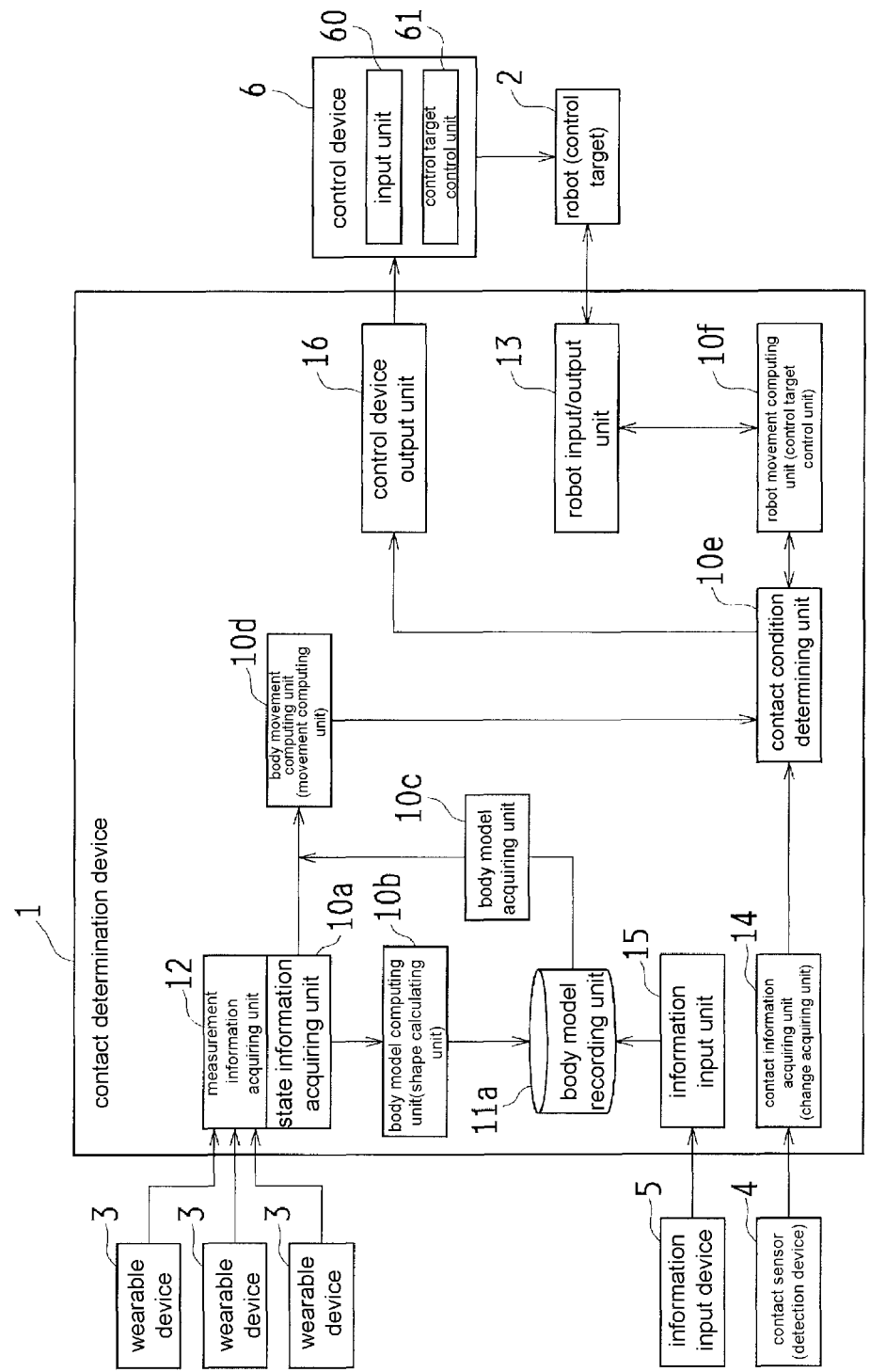
FIG. 9 is a functional block diagram illustrating an example of a functional configuration of various devices in another example of a system configuration of the contact determination system disclosed in this application.

FIG. 9 is a functional block diagram illustrating an example of a functional configuration of various devices in another example of a system configuration of the contact determination system disclosed in this application. For example, the control device 6 is formed using a device such as a control computer which controls the robot 2 and is connected to the contact determination device 1 and the robot 2.

The contact determination device 1 includes a control device output unit 16 as a communication interface with respect to the control device 6. In addition, the control device 6 includes various configurations such as an input unit 60 which serves as a communication interface with respect to the contact determination device 1, and a control target control unit 61 which controls the robot 2.

The contact determination device 1 outputs the contact condition determined by the contact condition determining unit 10e from the control device output unit 16 to the control device 6. The control device 6 receives an input of the contact condition from the input unit 60 and causes the control target control unit 61 to determine control over the robot 2 based on the contact condition. The control device 6 outputs a control command for arbitrarily controlling the robot 2 from the control target control unit 61 to the robot 2 based on the contact condition. A control command to be output to the robot 2 is a command to perform predetermined control set in advance with respect to the robot 2 such as continuing a movement, halting a movement, reducing an output regarding a movement, and performing a movement to avoid contact with a worker, as well as shifting to a safety mode and collecting information. That is, the control target control unit 61 included in the control device 6 realizes a function similar to that of the robot movement computing unit (control target control unit) 10f included in the contact determination device 1.

As described above, the contact determination system disclosed in this application can be developed in diverse system configurations.

The invention claimed is:

1. A contact determination device determining a contact condition between a target person and a control target, the contact determination device comprising: a state information acquiring unit that acquires at least one of positional information and postural information of the target person; a body model acquiring unit that acquires a body model related to a shape of the body of the target person;

a movement computing unit that computes a movement state of a computation target part in the body of the target person based on at least one of the positional information and the postural information acquired by the state information acquiring unit, and the body model acquired by the body model acquiring unit;

a change acquiring unit that acquires information regarding an electrical change;

and a contact condition determining unit that determines a contact condition between the target person and the control target based on the information regarding an electrical change acquired by the change acquiring unit, and the movement state of the computation target part of the target person computed by the movement computing unit;

wherein the contact condition determining unit has means for detecting contact between the target person and the control target based on the information regarding an electrical change acquired by the change acquiring unit, and means for identifying a contact part based on the movement state of the computation target part computed by the movement computing unit, when contact is detected.

2. The contact determination device according to claim 1, further comprising: a measurement information acquiring unit that acquires measurement information indicating a measurement result of a measurement target part of the target person, wherein the state information acquiring unit acquires at least one of the positional information and the postural information of the target person based on the measurement information acquired by the measurement information acquiring unit.

3. The contact determination device according to claim 2, wherein the state information acquiring unit computes at least one of the positional information and the postural information of the target person based on the measurement information acquired by the measurement information acquiring unit.

4. The contact determination device according to claim 3, wherein the measurement information acquiring unit acquires at least one of a speed, an acceleration, an angular speed, an angular acceleration, a pressure, and a magnetism as the measurement information.

5. The contact determination device according to claim 1, further comprising: a body model calculating unit that calculates the body model related to a shape of the body of the target person based on at least one of the positional information and the postural information acquired by the state information acquiring unit; and a body model recording unit that records the body model calculated by the body wherein the body model acquiring unit acquires the body model from the body model recording unit.

6. The contact determination device according to claim 1, further comprising: means for determining an approaching condition between the target person and the control target based on the movement state computed by the movement computing unit, wherein the change acquiring unit starts acquiring the information regarding an electrical change when the target person and the control target subjected to determination of the approaching condition there between are determined to have approached each other.

7. The contact determination device according to claim 1, wherein the state information acquiring unit acquires at least one of the positional information and the postural information of a plurality of target persons, and wherein the contact condition determining unit identifies a target person that has come into contact.

8. The contact determination device according to claim 1, wherein the change acquiring unit acquires at least one of a surface of the target person and a surface of the control target, or an electrical change in the vicinity thereof.

9. The contact determination device according to claim 1, further comprising: a control target control unit that outputs a control command to control the control target, based on the contact condition determined by the contact condition determining unit.

10. The contact determination device according to claim 9, wherein the control target control unit outputs a control command to continue a movement, to halt a movement, to reduce an output regarding a movement, or to perform a contact avoiding movement.

11. A control device controlling a control target, the control device comprising: an input unit that receives an input of a contact condition between the target person and the control target from the contact determination device according to claim 1;
and a control target control unit that outputs a control command to control the control target based on the contact condition received by the input unit.

12. The control device according to claim 11, wherein the control target control unit outputs a control command to continue a movement, to halt a movement, to reduce an output regarding a movement, or to perform a contact avoiding movement.

13. A contact determination system comprising:
a control target that moves based on control;
and the contact determination device according to claim 1 determining a contact condition, wherein the contact determination device includes a control target movement information acquiring unit which acquires control target movement information related to a movement of the control target, and wherein the contact condition determining unit determines a contact condition based on the control target movement information acquired by the control target movement information acquiring unit.

14. The contact determination system according to claim 13, wherein the contact determination device includes a control target control unit which outputs a control command to control the control target based on the contact condition determined by the contact condition determining unit.

15. The contact determination system according to claim 13, further comprising: a control device that controls the control target, wherein the control device includes an input unit which receives an input of a contact condition from the contact determination device, and a control target control unit which outputs a control command to control the control target based on the contact condition received by the input unit.

16. A contact determination method of determining a contact condition between a target person and a control target, the contact determination method comprising:
a step in which a state information acquiring unit acquires at least one of positional information and postural information of the target person;
a step in which a body model acquiring unit acquires a body model related to a shape of the body of the target person;
a step in which a movement computing unit computes a movement state of a computation target part in the body of the target person based on at least one of the positional information and the postural information acquired by the state information acquiring unit, and the body model acquired by the body model acquiring unit;
a step in which a change acquiring unit acquires information regarding an electrical change;
and a step in which a contact condition determining unit determines a contact condition between the target person and the control target based on the information regarding an electrical change acquired by the change acquiring unit, and the movement state of the computation target part of the target person computed by the movement computing unit;
wherein the step contact condition determining unit has means for detecting contact between the target person and the control target based on the information regarding an electrical change acquired by the change acquiring unit, and means for identifying a contact part based on the movement state of the computation target part computed by the movement computing unit, when contact is detected.

17. A non-transitory computer-readable recording medium comprising a contact determination program for causing a computer to determine a contact condition between a target person and a control target, the contact determination program causing the computer to execute:
- a step of acquiring at least one of positional information and postural information of the target person;
- a step of acquiring a body model related to a shape of the body of the target person;
- a step of computing a movement state of a computation target part in the body of the target person based on at least one of the acquired positional information and postural information, and the acquired body model;
- a step of acquiring information regarding an electrical change;
- and a step of determining a contact condition between the target person and the control target based on the acquired information regarding an electrical change and the computed movement state of the computation target part of the target person;
- wherein the step of determining a contact condition has means for detecting contact between the target person and the control target based on the information regarding an electrical change, and means for identifying a contact part based on the movement state of the computation target part, when contact is detected.

18. The contact determination device according to claim 2, further comprising: a body model calculating unit that calculates the body model related to a shape of the body of the target person based on at least one of the positional information and the postural information acquired by the state information acquiring unit; and a body model recording unit that records the body model calculated by the body model calculating unit, wherein the body model acquiring unit acquires the body model from the body model recording unit.

19. The contact determination device according to claim 2, wherein the contact condition determining unit has means for detecting contact between the target person and the control target based on the information regarding an electrical change acquired by the change acquiring unit, and means for identifying a contact part based on the movement state of the computation target part computed by the movement computing unit, when contact is detected.

* * * * *